United States Patent [19]

Tsunoda et al.

[11] Patent Number: 4,757,455
[45] Date of Patent: Jul. 12, 1988

[54] NAVIGATION SYSTEM FOR A VEHICLE

[75] Inventors: Masakazu Tsunoda; Seiichi Tohjyo; Toshiyuki Itoh; Hiroshi Ueno, all of Kanagawa; Satoshi Araki, Chiba, all of Japan

[73] Assignee: Nissan Motor Company, Limited, Tokyo, Japan

[21] Appl. No.: 836,624

[22] Filed: Mar. 5, 1986

[30] Foreign Application Priority Data

Mar. 8, 1985 [JP] Japan .................. 60-46167

[51] Int. Cl.⁴ ........................... G06F 15/50
[52] U.S. Cl. .................... 364/449; 364/521; 340/988; 340/995; 73/178 R
[58] Field of Search .......... 364/443, 444, 449, 521, 364/571, 460; 73/178 R; 342/450, 451; 340/988, 990, 995

[56] References Cited

U.S. PATENT DOCUMENTS

| 4,442,609 | 4/1984 | Senoo | 33/356 |
| 4,459,667 | 7/1984 | Takeuchi | 364/449 |
| 4,470,119 | 9/1984 | Hasebe et al. | 364/449 |
| 4,517,565 | 5/1985 | Nakamura et al. | 364/460 |
| 4,521,777 | 6/1985 | Nakamura et al. | 364/460 |
| 4,550,317 | 10/1985 | Moriyama et al. | 340/995 |

FOREIGN PATENT DOCUMENTS 2120387 11/1983 United Kingdom.

Primary Examiner—Gary Chin
Attorney, Agent, or Firm—Lowe, Price, LeBlanc, Becker & Shur

[57] ABSTRACT

A navigation system for a vehicle generates a guide display in the form of a diagrammatic roadmap during travel on surfaces roads and in the form of a textual road-name display exclusively during travel on freeways. In addition, the navigation system has a manual reset switch which triggers the change of the display image back to the diagrammatic roadmap after freeway travel and replacement of a deduced vehicle position with the known position of a road feature at which a driver is prompted to push the reset switch.

10 Claims, 6 Drawing Sheets (1)

(2)

(3)

NAVIGATION SYSTEM FOR A VEHICLE

BACKGROUND OF THE INVENTION

The present invention relates to a navigation system which displays the present position of a vehicle on a course of travel course from a start position to a destination.

This kind of navigation system is exemplified by Japanese Patent Application Unexamined Open No. Sho 56-74798.

In the above-identified document, a conventional navigation system employs a display unit. After an operator (driver) selects both a start point and a destination point from a diagrammatic roadmap image on the screen, the system searches map data stored on a memory for the most suitable course and then displays that course on the roadmap displayed on the screen. When the vehicle on which the navigation system is mounted starts to move, the system derives the present position of the vehicle from the orientation of the vehicle detected by means of a magnetic direction sensor and the displacement of the vehicle by means of a distance sensor and displays the continuously changing present position of the vehicle on the roadmap.

However, the conventional navigation system has the drawbacks described below. Since the calculation of the present position of the vehicle is carried out on the basis of the output signals from a magnetic direction sensor which relies on geomagnetism, the present position of the vehicle will incur errors due to inaccurate detection of direction when the vehicle moves through magnetic disturbances.

This will be especially significant on freeways. The ferromagnetic reinforced concrete structure of the freeway itself adversely effects geomagnetic devices of all sorts. The same problem arises when the vehicle crosses bridges or passes through tunnels. In such cases, the measured travel distance will also tend to exceed the real travel distance, and all these errors add up as the vehicle approaches its destination. Consequently, the guide display on the displayed roadmap can be inaccurate enough to actually be misleading.

SUMMARY OF THE INVENTION

With the above-described drawbacks in mind, it is an object of the present invention to provide a vehicle navigation system which provides an accurate guide display even when the vehicle is travelling on freeways, etc. which normally induce errors in magnetic sensing devices.

This can be achieved by providing a navigation system for a vehicle, comprising: (a) first means for storing map data, (b) second means for detecting geomagnetic North, (c) third means for deducing the current position of the vehicle on the basis of the sensed output of the second means, (d) fourth means for manually selecting a starting point and a destination, (e) fifth means for selecting a travel course of the vehicle between the starting point and the destination on the basis of roadmap data from the first means and displaying the travel course of the vehicle on a display with the current position of the vehicle deduced by the third means, and the starting point and the destination selected by way of the fourth means also displayed thereon, and (f) sixth means for changing the travel course display image on the display unit from a diagrammatic roadmap to a road-name display while the vehicle is travelling on a freeway.

BRIEF DESCRIPTION OF THE DRAWINGS

A more complete understanding of the present invention may be obtained from the following detailed description taken in conjunction with the attached drawings in which.

DETAILED DESCRIPTION OF THE PREFERRED EMBODIMENTS

Reference will hereinafter be made to the drawings in order to facilitate understanding of the present invention.

Figure 1:
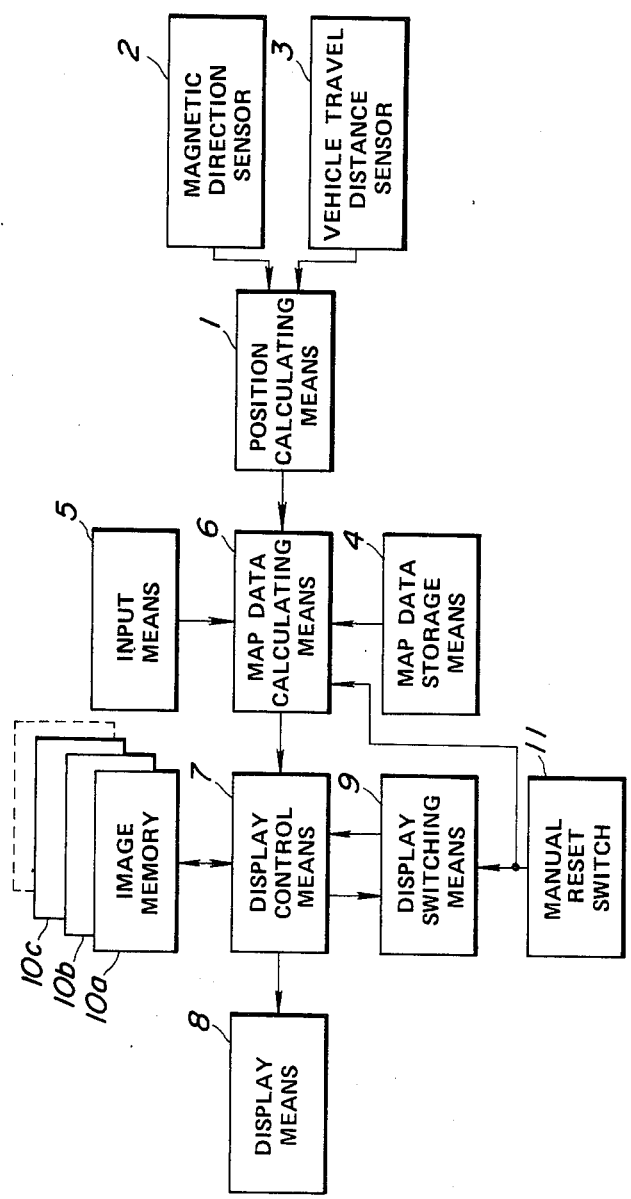
FIG. 1 is a functional block diagram of a basic vehicle navigation system according to the present invention.

FIG. 1 is a functional block diagram of a vehicle navigation system according to the present invention. In FIG. 1, position calculation means 1 calculates the present position of a vehicle on which the navigation system according to the present invention is mounted on the basis of the output signals from a magnetic direction sensor 2 and from a travel distance sensor 3.

The magnetic direction sensor 2 outputs the direction detection signal representing the forward direction of the vehicle with respect to geomagnetic North. The structure of the magnetic direction sensor is exemplified by U.S. Pat. No. 4,442,609 patented on Apr. 17, 1984 (which corresponds to West German Patent No. DE-31,36,505). The contents of the above-identified U.S. Pat. document are hereby incorporated by reference.

The travel distance sensor 3 monitors the distance travelled by the vehicle and outputs a distance pulse for each unit of travel distance.

Road map storage means 4 stores road network data, e.g., X-Y coordinate data of intersections within predetermined districts. Furthermore, the road network data is divided into freeway data and surface road data.

The data on the freeway network includes flag indicating limited access, i.e. whether or not the road is a freeway in order to distinguish surface roads from freeways.

In FIG. 1, input means 5 comprising a keyboard allows entry of data required for the guide display, such as the starting point and the destination, when the guide display is in use.

Map data claculating means 6 reads the map data for a preselected district from the map data storage means 4, executes a course search for the vehicle path to the destination on the basis of the data for roads between the start point and the destination, and displays a roadmap image on display means 8 comprising a liquid crystal display unit or cathode-ray tube (CRT) via display control means 7. Furthermore, when a manual reset is received during guide display, the map data calculating means 6 carries out a correction process which corrects the present position data of the vehicle.

Display control means 7 displays the diagrammatic roadmap set up by the map data calculating means 6 on the display means 8. In addition, the display control means 7 displays the selected vehicle travel course and controls the display operation in which the present position of the vehicle calculated by the position calculating means 1 is displayed as a brilliant point on the travel course.

Display switching means 9 checks to see if the vehicle is entering a freeway by checking whether or not the present position of the vehicle coincides with a road for which the freeway flag is set to indicate that the road the vehicle is entering is a freeway. If so, display switching means 9 outputs a switch command which orders the display control means 7 to change from the diagrammatic roadmap to a text road-name display.

The data for the road-name display during travel on freeways are stored in dedicated image memories 10a, 10b, 10c, etc. The display control means 7 reads the corresponding road-name display image from among the image memories 10a through 10c and displays the image on the screen of the display means 8. A manual reset switch 11 is connected to the display switching means 9 and map data calculating means 6. When the manual reset switch 11 is operated at an exit of a freeway or at a toll gate after the display has been operating in road-name display mode, the display switching means 9 issues a command ordering the display control means 7 to change the display to the original roadmap image.

In addition, in response to the reset signal from the manual reset switch 1, the map data calculating means 11 executes a position correction process by which the present position data of the vehicle derived by the position calculating means 1 is corrected. The above-described display switching means 9 and manual reset switch 11 constitute a switching means.

It is noted that although the manual reset switch 11 comprises an exclusive reset switch, a start button λ for a guide display start installed on the input means 5 may be substituted for the manual reset switch 11.

Figure 2:
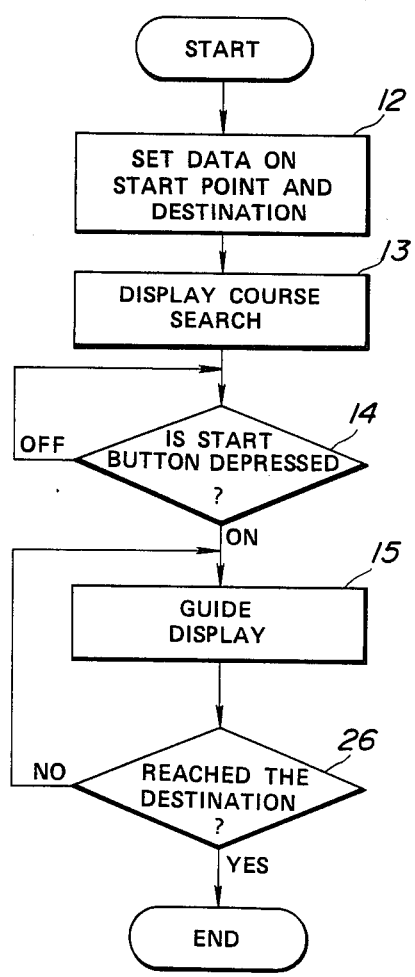
FIG. 2 is a general operational flowchart of a guide display in the navigation system shown in FIG. 1.

Next, the guide display operation will be described. FIG. 2 is a general flowchart for the guide display.

In a first step 12, once a district over which the vehicle is to move is specified by means of input means 5, the road network data for the selected district stored in the map data storage means 4 are read and sent to the display control means 7. The display control means 7 displays the roadmap graphics on the display means 8.

After an operator inputs the starting point and the destination through the input means 5 in step 12, the data for the start point and the destination are sent to the map data calculating means 6. The map data calculating means 6 receives the data on the start point and the destination, searches in step 13 for an optimum vehicle travelling course which is shortest in distance and in time, and displays the resulting vehicle travel course on the roadmap image on the display means 8. The above-described processing completes preparations for the guide display and the system enters a stand-by mode at step 14.

Figure 3:
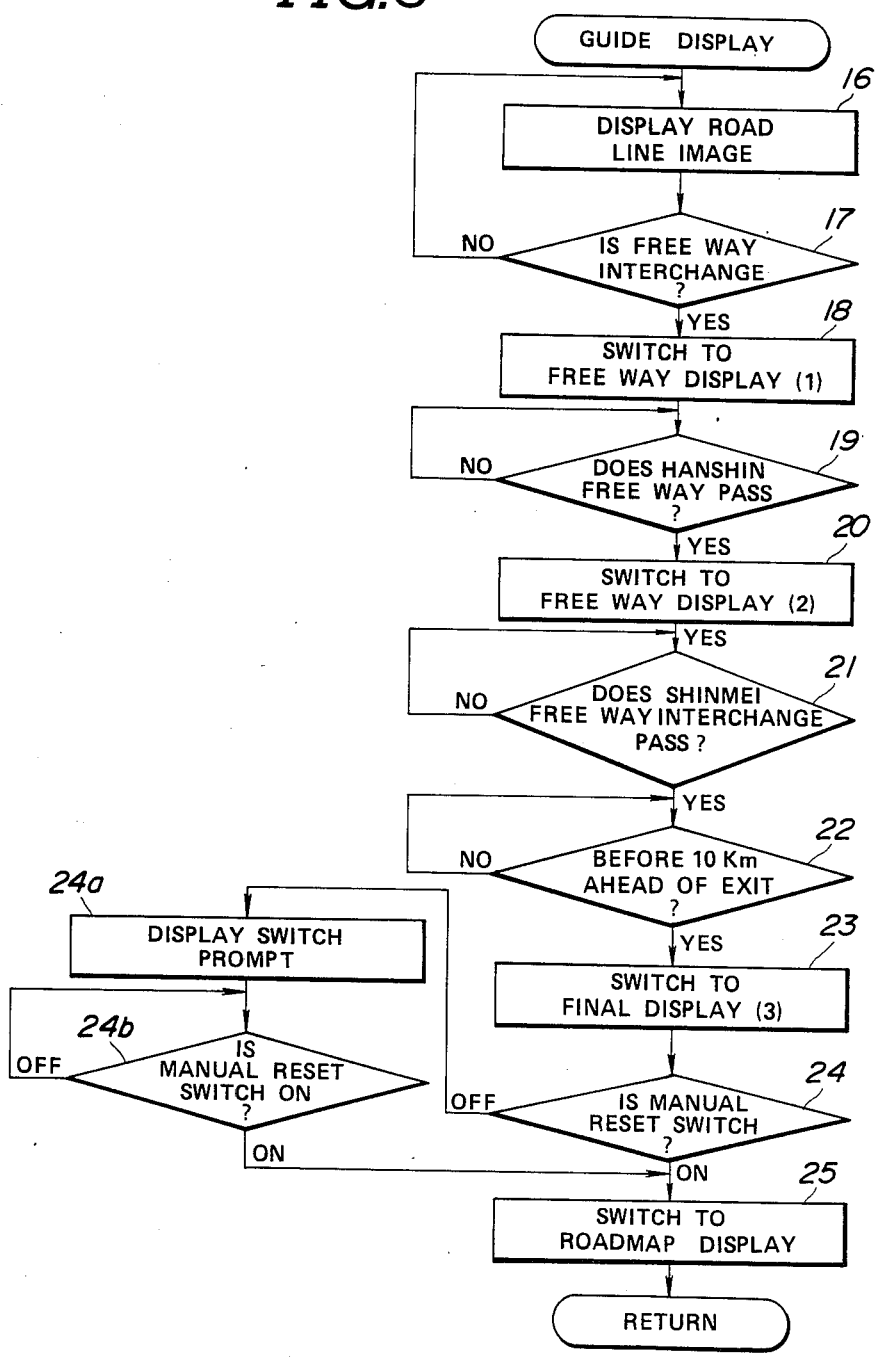
FIG. 3 is a more detailed flowchart of the guide display process for one case of freeway travel in Japan.

As the vehicle starts to move, the start button λ provided in the input means 5 is depressed. This triggers step 15 in which a guide display starts to continuously display the changing present position of the vehicle along the displayed course. That is to say, when the start button λ is depressed in a step 14, the routine goes to a step 15. FIG. 3 is a flowchart for the subroutine of the step 15.

Figure 4:
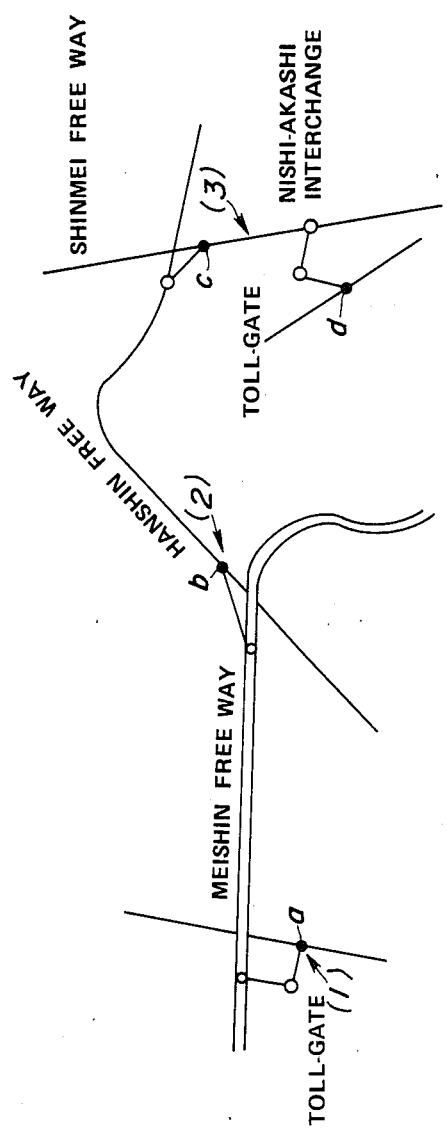
FIG. 4 is a diagrammatic roadmap for the guide display example shown in FIG. 3.

The processing flowchart shown in FIG. 3 represents the guide display processing in a typical case involving a stretch of freeway travel along a longer travel course toward a destination, as shown on the roadmap of FIG. 4.

In the case of the road map of FIG. 4, the vehicle leaves a surface street for the Meishin freeway, follows the Meishin freeway to the Shinmei freeway via the Hanshin freeway, and exits at the Nishiakashi interchange to surface streets. In this case, the intersection data for junctions a, b, c, and d are retrieved from the map data storage means as the road network data.

The guidance display operation when the vehicle moves on the freeway will be described with reference to the flowchart in FIG. 3. As the vehicle moves along surface streets before reaching the freeway junction a, guidance by means of the diagrammatic roadmap display is carried out in a step 16. In a step 17, the circuit determines whether the freeway junction a with the Meishin freeway has been reached. Once the vehicle has entered the freeway, the display switching means 7 switches to the textual road-name display, i.e., a freeway display shown in FIGS. 5 to 7. The road-name display shown in FIG. 5 reads "ENTER SHINMEI FREEWAY FROM MEISHIN FREEWAY VIA HANSHIN FREEWAY CLOCKWISE".

Note that when the vehicle is moving on a freeway, the magnetic direction sensor used in calculating the present position of the vehicle cannot be relied upon for accurate direction information, as discussed previously. Consequently, if the guide display employed the normal diagrammatic roadmap graphics, the position of the vehicle along the vehicle travel course would start to deviate from reality. However, using the road-name display, such as is shown in FIG. 5, the deviation of the vehicle from its calculated position can be ignored and corrected later, as explained below.

After the first freeway display (FIG. 5) has been set up in step 18, the sysem checks in the next step 19 for the approach of the junction b with the Hanshin freeway. It should be noted that the determination of whether the vehicle has passed the junction b with the Hanshin freeway in the step 19 depends solely on the travel distance between the junctions a and b. When the actual distance travelled reaches the previously calculated distance between junctions, the display control means 7 recognizes that the vehicle has reached the junction b.

Figure 5:
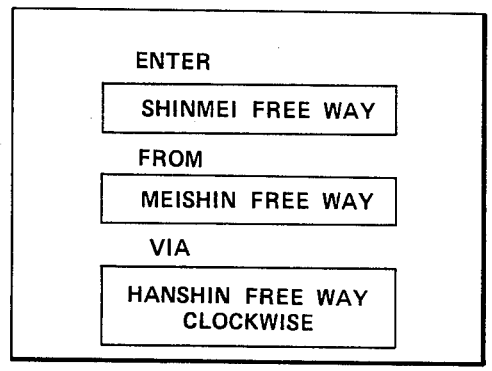
FIGS. 5, 6, and 7 are exemplary screens showing how guidance could be mediated by a display unit of the navigation system according to the present invention.
Figure 6:
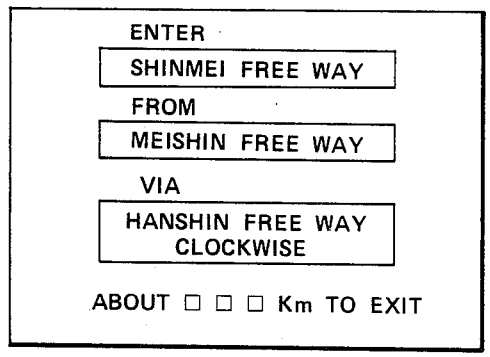

After the vehicle reaches the junction b in the step 19, the routine goes to a step 20 in which the display switching means 9 changes the image shown in FIG. 5 to the second freeway display screen shown in FIG. 6.

The contents of the freeway display (2) are basically the same as shown in FIG. 5. However, a remaining distance to the exit is additionally displayed. The indication of the remaining distance varies according to the distance travelled by the vehicle.

The display control means 7 next checks whether the vehicle has reaches of the junction c with the Zinmei freeway in the step 21. After the vehicle enters the Shinmei freeway from the Hanshin freeway via junction c, the guide display on the road- name display the display control means 7 checks to see whether the vehicle has reached a point 10 kilometers before the exit in the next step 22, i.e., if the vehicle is within 10 kilometers of the Nishiakashi Interchange. Once the vehicle is within about 10 kilometers of the Nishiakashi Interchange, the routine goes to a step 23 in which the display switches to the final display screen (3) shown in FIG. 7. Specifically, the display reads "Exit Shinmei turnpike at Nishiakashi Interchange" to inform the driver how to get off the freeway. In addition, the display control means 7 directs the driver to "Push the START button λ at the toll gate for the next guidance", to trigger a return to the roadmap display.

Therefore, after the image has switched to the final display screen (3) in the step 23, the operation of the manual reset switch which is mediated by the start button λ in a step 24 is monitored. When the vehicle reaches the tollgate via the Nishiakashi Interchange and the start button λ is pushed, the routine goes to the step 25 in which the switch to the roadmap display is carried out. Since the vehicle has reached the junction d to the first general road after passing through the tollgate, the road network data for the area around the junction d is retrieved. In addition, a correction process is carried out in which the calculated present position data of the vehicle is replaced by the stored position data of the junction d in order to correct for any errors due to freeway travel.

It should be noted that in cases where the manual reset switch is not operated at the tollgate after leaving the freeway in the flowchart of FIG. 3, the routine goes to a step 24a in which the display prompts the driver to push the START button for the next guidance. If the manual reset switch is operated in a step 24b, the switch to the diagrammatic roadmap graphics is carried out in the step 25.

After the end of the control processing shown in FIG. 3, the routine again returns to the flowchart shown in FIG. 2. In a step 26 after the guide display in the step 15, the display control means 7 checks for arrival at the destination. Once the vehicle has arrived at the destination, the guide display is ended.

Figure 8:
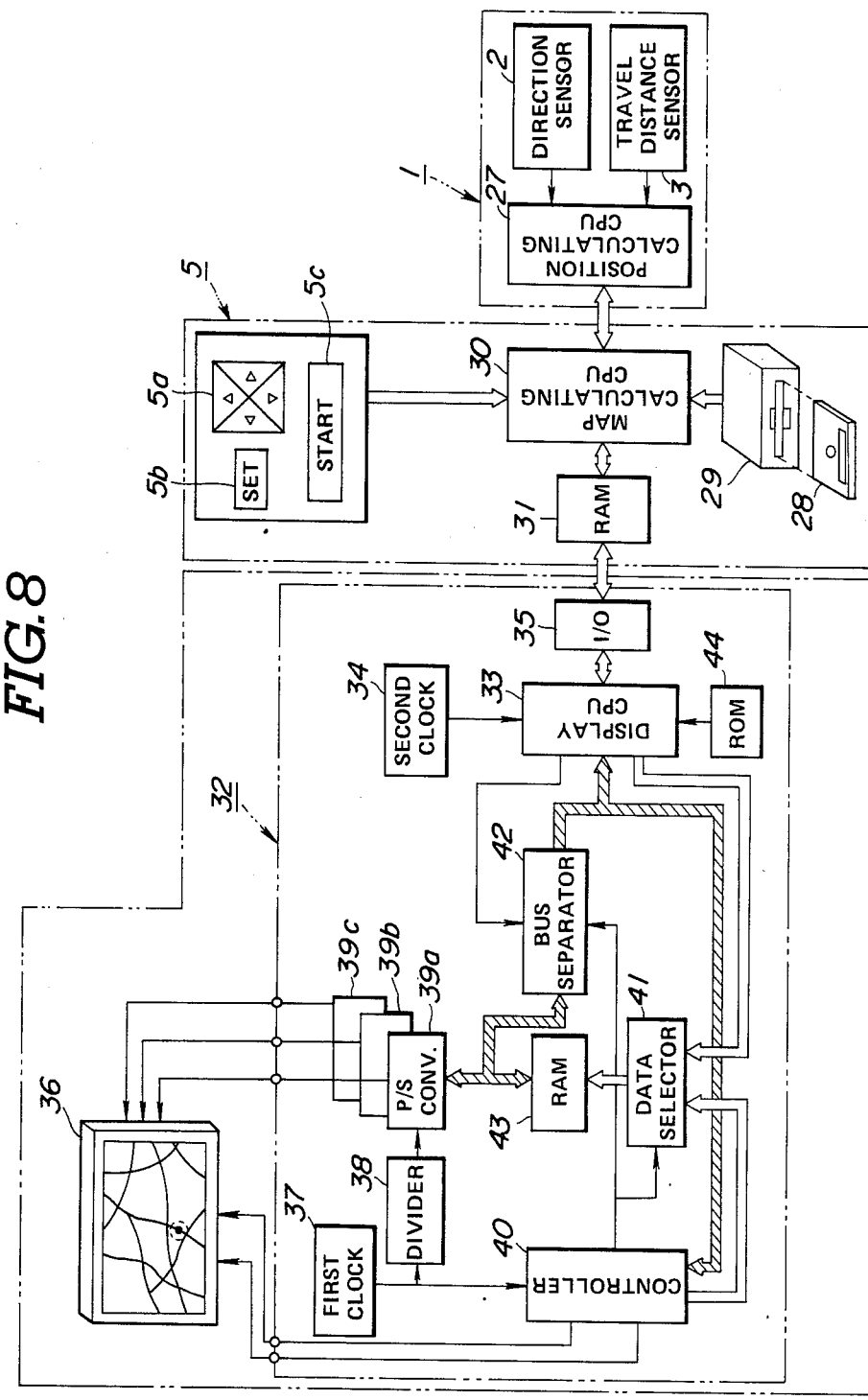
FIG. 8 is a circuit block diagram of a preferred embodiment of the navigation system based on the functional block diagram shown in FIG. 1 according to the present invention.

FIG. 8 shows a circuit block diagram of a specific example of the navigation system.

In FIG. 8, a position calculating CPU (Central Processing Unit) 27 serves as the map calculating means 1 shown in FIG. 1 and calculates the present vehicle position on the basis of the outputs of the magnetic direction sensor 2 and travel distance sensor 3.

The map data calculating means 6 shown in FIG. 1 is realized in a map calculating CPU (Central Processing Unit) 30 and RAM (Read Access Memory) 31. In addition, at least one ROM (Read-Only Memory) card 28 which permanently stores the map data serves as the map data storage means. The ROM card 28 or cards are inserted into a card reader 29 to allow CPU 30 to read the map data.

The input means 5 comprises: cursor control keys 5a for moving a cursor in four directions (horizontal and vertical directions); a set key 5b which sets the start point and the destination to those positions marked by the cursor; and a keyboard with a start button 5c. The start button 5c also serves as a manual reset switch which issues a command to change from the road-name display during freeway travel to the roadmap display during surface road travel.

The display control means 7 and display switching means 9 shown in FIG. 1 are both realized in a single display CPU (Central Processing Unit) 33 mounted in a display control circuit 32. The display CPU 33 receives clock pulses from a second clock 34. A display control is executed in control cycles based on the clock pulse rate. Furthermore, all of the display data for the diagrammatic roadmaps, the freeway displays, the vehicle travel course, and present vehicle position are inputted by way of an I/O circuit 35. The guide display is carried out on a display unit 36 searching as the display means 8 shown in FIG. 1 via subsequent stages of the display control circuit. The display control circuit element subsequent to the display CPU 33 include a first clock 37, a divider 38, P/S converters 39a through 39c, a controller 40, a data selector 41, a bus separator 42, and RAM (Random Access Memory) storing the final display image.

Figure 7:
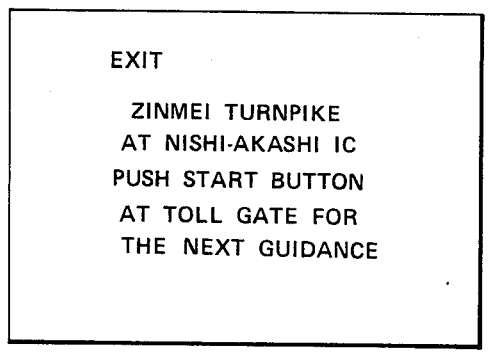

Furthermore, the display CPU (Central Processing Unit) 33 includes a dedicated ROM 44. The ROM (Read Only Memory) 44 serves as an image memory in which the road-name display images used during the freeway travel, as shown in FIGS. 5, 6, and 7, are stored. In place of the ROM 44, the display CPU 33 may be programmed to generate the display images itself.

As described above, since in the navigation system according to the present invention, the diagrammatic roadmap display used during the travel on surface roads is switched to the textual road-name display during freeway travel, any deviations of the calculated vehicle position due to errors in the output of the magnetic direction sensor can be ignored during the travel on freeways, which are otherwise prove to induce errors in the magnetic direction sensor. Since no navigation errors are likely while travelling along a freeway as long as the name of road is clearly specified, there is no loss with regard to guidance.

When the reset switch is operated after getting off the freeway, the position of vehicle, which may have acquired some error during freeway travel, is automatically corrected at the same time the display is returned to the diagrammatic roadmap display.

It will clearly be appreciated by those skilled in the art that the foregoing description is made in terms of the preferred embodiment and various changes and modifications may be made without departing from the scope of the present invention which is to be defined by the appended claims.

What is claimed is:

1. A navigation system for a vehicle, comprising:
   (a) first means for storing map data;
   (b) second means for detecting geomagnetic North;
   (c) third means for deducing the current position of the vehicle on the basis of the sensed output of the said second means;
   (d) fourth means for manually selecting a starting point and a destination;
   (e) fifth means for selecting a travel course of the vehicle between said starting point and said destination on the basis of said map data from said first means and displaying the travel course of the vehicle on a display with the current position of the vehicle deduced by said third means, and the starting point and the destination selected by way of said fourth means also displayed thereon; and
   (f) sixth means for comparing the current position of the vehicle deduced by said third means with said stored map data from said first means to determine if the vehicle is travelling on a freeway, said sixth means further changing the travel course display image on the display unit from a diagrammatic map to a road-name display while the vehicle is travelling on a freeway.

2. The navigation system according to claim 1, which further comprises a manual reset switch wherein when the reset switch is operated,
the third means corrects the current position of the vehicle deduced on the basis of the sensed output using the map data stored in the first means and the sixth means is triggered to return the display of the road-name display to that of the diagrammatic map display.

3. The navigation system according to claim 2, wherein the fifth means displays a message on the display unit to inform an operator to operate the manual reset switch, said message being displayed in response to a comparison of the current position of the vehicle with said stored map data indicating a vehicle location at an exit of the freeway.

4. A method for navigating a vehicle, comprising the steps of:
(a) storing image data on roadmap;
(b) displaying diagrammatically the map image stored in said step (a);
(c) searching an optimum travel course of the vehicle according to data on a selected starting point and selected destination;
(d) displaying the diagrammatic map image on which the searched optimum travel course of the vehicle in said step (c) is superposed;
(e) displaying the current position of the vehicle along the optimum travel course on the basis of the detected output of a magnetic direction sensor for detecting a direction of the vehicle with respect to the geomagnetic North;
(f) determining whether the vehicle has reached a junction to a freeway through which the vehicle will reach the destination on the basis of the current travel position of the vehicle; and
(g) changing the travel course display image from the diagrammatic map displayed in said step (d) to a road-name display when determining that the vehicle has reached the junction in said step (f).

5. The method according to claim 4, which further comprises the steps of:
(h) determining whether the vehicle has left said junction to the freeway; and
(i) changing the travel course display image from the road-name display to the diagrammatic map when determining that the vehicle has left the junction to the freeway.

6. The method according to claim 4, wherein the current position of the vehicle when the vehicle travels on the freeway is determined only on the basis of the detected output of a travel distance sensor for detecting the travel distance of the vehicle.

7. The method according to claim 6, wherein said step (g) further comprises the steps of (h) determining whether the vehicle has reached a predetermined distance before the junction to the freeway at which the vehicle will leave the freeway and (i) displaying the road-name display indicating to exit the junction and push a start button at a tollgate to change the travel course display image from the road-name display to the diagrammatic roadmap display when determining that the vehicle has reached the junction in said step (h).

8. The method according to claim 7, wherein the current position data on the basis of the detected output of the magnetic direction sensor is cancelled when the start button is pushed.

9. The method according to claim 8, wherein the current position data of the vehicle is preset to the position data of the tollgate when the start button is pushed at the tollgate.

10. The method according to claim 8, wherein the current position data of the vehicle is preset to the position data of a first intersection after the travel through the tollgate when the start button is pushed.

* * * * *

UNITED STATES PATENT AND TRADEMARK OFFICE
CERTIFICATE OF CORRECTION

PATENT NO. : 4,757,455

DATED : July 12, 1988

INVENTOR(S) : Masakazu Tsunoda et al

It is certified that error appears in the above-identified patent and that said Letters Patent is hereby corrected as shown below:

On the title page assignee should read

-- Nissan Motor Company, Limited, Kanagawa-Ken, Japan and Niles Parts Company, Limited, Tokyo, Japan --.

Signed and Sealed this

Twentieth Day of June, 1989

*Attest:*

DONALD J. QUIGG

*Attesting Officer*   *Commissioner of Patents and Trademarks*